(12) United States Patent
Zhang (10) Patent No.: US 11,101,623 B2
(45) Date of Patent: Aug. 24, 2021

(54) SWITCHGEAR

(71) Applicant: Shandong Guangyun Intelligent Technology Co., Ltd., Jinan (CN)

(72) Inventor: Jingmin Zhang, Jinan (CN)

(73) Assignee: Shandong Guangyun Intelligent Technology Co., Ltd., Jinan (CN)

( * ) Notice: Subject to any disclaimer, the term of this patent is extended or adjusted under 35 U.S.C. 154(b) by 0 days.

(21) Appl. No.: 16/952,019

(22) Filed: Nov. 18, 2020

(65) Prior Publication Data
US 2021/0075199 A1    Mar. 11, 2021

Related U.S. Application Data

(63) Continuation-in-part of application No. PCT/CN2019/105435, filed on Sep. 11, 2019.

(30) Foreign Application Priority Data

Aug. 22, 2019   (CN) .......................... 201910781249.3

(51) Int. Cl.
| H02B 1/04  | (2006.01) |
| H02B 1/20  | (2006.01) |
| H02B 3/00  | (2006.01) |
| H02B 1/52  | (2006.01) |
| H02B 1/052 | (2006.01) |
| H02B 1/30  | (2006.01) |

(52) U.S. Cl.
CPC ............... *H02B 1/52* (2013.01); *H02B 1/041* (2013.01); *H02B 1/052* (2013.01); *H02B 1/20* (2013.01); *H02B 1/308* (2013.01); *H02B 3/00* (2013.01)

(58) Field of Classification Search
CPC .......... H02B 1/041; H02B 1/052; H02B 1/20; H02B 1/30; H02B 1/308; H02B 1/52; H02B 3/00; H01R 4/30
See application file for complete search history.

(56) References Cited

U.S. PATENT DOCUMENTS

2018/0066696 A1 * 3/2018 Gonella ................. F16B 7/187
2018/0090913 A1    3/2018 Johnson et al.

FOREIGN PATENT DOCUMENTS

| CN | 108011211  A  * | 5/2018 |          |
| CN | 207939153  U  * | 10/2018 |         |
| WO | WO-2010124728 A1 * | 11/2010 | ............... H02B 1/21 |

* cited by examiner

*Primary Examiner* — Robert J Hoffberg
(74) *Attorney, Agent, or Firm* — True Shepherd LLC; Andrew C. Cheng (57) ABSTRACT

A switchgear including at least one high-voltage switch cabinet, a copper busbar, a copper incoming line, a support sleeve, a plurality of electric wrenches disposed on the support sleeve, and a plurality of operating handles disposed on the plurality of electric wrenches, respectively. The at least one high-voltage switch cabinet comprises an end cover including a plurality of slots. The copper busbar and the copper incoming line are fixedly connected to the at least one high-voltage switch cabinet. The copper busbar is T-shaped and perpendicularly connected to a bus. The section of the copper incoming line is rectangular. The copper busbar is a guide rail including a body and two ends. The two ends of the guide rail are bent to form two bending parts, respectively. The copper incoming line is disposed in a cavity formed by the two bending parts and the body of the copper busbar.

9 Claims, 6 Drawing Sheets

SWITCHGEAR

CROSS-REFERENCE TO RELATED APPLICATIONS

This application is a continuation-in-part of International Patent Application No. PCT/CN2019/105435 with an international filing date of Sep. 11, 2019, designating the United States, and further claims foreign priority benefits to Chinese Patent Application No. 201910781249.3 filed Aug. 22, 2019. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to a switchgear.

In an electric power system, switchgear is composed of electrical disconnect switches, fuses or circuit breakers used to control, protect and isolate electrical equipment. Switchgear is used both to de-energize equipment to allow work to be done and to clear faults downstream.

A conventional switch cabinet includes a fixed cabinet body and a vacuum circuit breaker disposed in a movable handcart. The fixed cabinet body comprises four small rooms: a bus room, a circuit breaker room, a cable room, and a low voltage room. In case of annual maintenance or troubleshooting, the interruption of power supply to the switch cabinet often lasts more than 8 hours.

SUMMARY

The disclosure provides a switchgear comprising at least one high-voltage switch cabinet, a copper busbar, a copper incoming line, a support sleeve, a plurality of electric wrenches disposed on the support sleeve, and a plurality of operating handles disposed on the plurality of electric wrenches, respectively. The at least one high-voltage switch cabinet comprises an end cover comprising a plurality of slots. The copper busbar and the copper incoming line are fixedly connected to the at least one high-voltage switch cabinet; the copper busbar is T-shaped and perpendicularly connected to a bus; a section of the copper incoming line is rectangular; the copper busbar is a guide rail comprising a body and two ends; the two ends of the guide rail are bent to form two bending parts, respectively; and the copper incoming line is disposed in a cavity formed by the two bending parts and the body of the copper busbar; the copper busbar and the copper incoming line each comprise at least two bolt holes; the at least two bolt holes on the copper busbar are aligned with the at least two bolt holes on the copper incoming line, respectively; the plurality of electric wrenches each comprises a first end and a second end; the first end is provided with a bolt, and the second end is connected to a compression spring; the bolt is aligned with one of the at least two bolt holes of the copper busbar and the copper incoming line; the plurality of operating handles is extended out of the end cover via the plurality of slots, respectively; and the plurality of operating handles is capable of reciprocating in the plurality of slots, respectively.

In a class of this embodiment, the copper busbar and the copper incoming line each comprise two bolt holes; and an included angle between each bolt hole and an outer end face of the copper busbar or the copper incoming line is 45° or 135°.

In a class of this embodiment, the plurality of electric wrenches is an electric constant torque wrench.

In a class of this embodiment, the first end of the plurality of electric wrenches is magnetic and is coated with a temperature resistant insulation material.

In a class of this embodiment, the guide rail of the copper busbar is telescopic and comprises two members; the two members are interlocked using a hinge pin.

In a class of this embodiment, the at least one high-voltage switch cabinet comprise a cabinet body and a passageway; two sides of the cabinet body comprise a location rod and a location hole matching the location rod, respectively; the location rod is slidably disposed in the passageway; when the at least one high-voltage switch cabinet is installed, one end of the location rod is fixed in the location hole via a locking device.

In a class of this embodiment, the switchgear further comprises a slideway along which the at least one high-voltage switch cabinet is movable to an installation area; the at least one high-voltage switch cabinet further comprises a bottom cover provided with a groove matching the slideway; the slideway comprises a sliding part and a movable part; a secondary rail is disposed below the movable part; the at least one high-voltage switch cabinet is movable from the sliding part to the movable part of the installation area, and then the movable part moves on the secondary rail to transport the at least one high-voltage switch cabinet to a target position for installation and fixation.

In another aspect, the disclosure provides a method for replacing a high-voltage switch cabinet of the switchgear, the method comprising:

1) separating the copper busbar and the copper incoming line of a broken high-voltage switch cabinet, unlocking the locking device, and moving the movable part along the secondary rail to connect to the sliding part;
2) moving the broken high-voltage switch cabinet to a maintenance area through the sliding part;
3) moving a backup high-voltage switch cabinet via the sliding part to the movable part;
4) inserting a location rod of the backup high-voltage switch cabinet into a location hole of the backup high-voltage switch cabinet;
5) moving the movable part along the secondary rail to fix and fit the backup high-voltage switch cabinet with an adjacent high-voltage switch cabinet; locking the locking device, connecting the copper busbar and the copper incoming line, and aligning corresponding bolt holes of the copper busbar and the copper incoming line;
6) operating the plurality of operating handles to linearly move the plurality of electric wrenches until the bolt reaches a corresponding bolt hole;
7) switching on the plurality of electric wrenches to enable the bolt to insert into the corresponding bolt hole thus coupling the copper busbar and the copper incoming line; and
8) loosening the plurality of operating handles, so that the plurality of electric wrenches restores to original positions under an elastic force of the compression spring, thus achieving the replacement of the broken high-voltage switch cabinet.

In a class of this embodiment, 1) comprises:

1.1) operating the plurality of operating handles to linearly move the plurality of electric wrenches to catch the bolt;

1.2) reversely rotating the plurality of electric wrenches to pull the bolt out of the bolt hole, where the bolt is attached to the first end of the plurality of electric wrenches through magnetic force;

1.3) loosening the plurality of operating handles, so that the plurality of electric wrenches restores to original positions under an elastic force of the compression spring;

1.4) unlocking the locking device, and detaching the broken high-voltage switch cabinet from the device; and 1.5) moving the movable part along the secondary rail to connect to the sliding part.

The following advantages are associated with the switchgear of the disclosure:

1. Two high-voltage switch cabinets of the switchgear are connected to each other through the copper busbar and the copper incoming line. The installation of the switchgear involves no complex disassembly operation, and can still be carried out under the condition of electrification. When the cabinet body malfunctions and needs to be repaired, the switchgear can be recovered by quickly replacing the fault switch cabinet by a backup switch cabinet, thus saving the maintenance time and installation time.

2. The guide rail of the copper busbar comprises two members interlocked using a hinge pin. When the electric wrench breaks down, the copper busbar can be detached manually, thus providing a more choice of disassembly of the copper busbar.

3. Through the design of the location rod and the location hole on the high voltage switch cabinet, the high voltage switch cabinet can be quickly aligned with adjacent ones during installation without using external rulers or tools.

4. The switchgear further comprises the slideway; a broken high-voltage switch cabinet is movable along the slideway to a maintenance area and a backup high-voltage switch cabinet is movable along the slideway to an installation area, thus improving the working efficiency.

In the drawings, the following reference numbers are used: 10. Copper incoming line; 20. Copper busbar; 21. Hinge pin; 22. Bending part; 30. Bolt hole; 40. Electric wrench; 41. Support sleeve; 42. Bolt; 43. Compression spring; 44. Operating handle; 45. Slot; 50. Location rod; 51. Location hole; 60. Slideway; 61. Sliding part; 62. Movable part; and 63. Secondary rail.

DETAILED DESCRIPTION

To further illustrate the disclosure, embodiments detailing a switchgear are described below. It should be noted that the following embodiments are intended to describe and not to limit the disclosure.

Example 1

Figure 1:
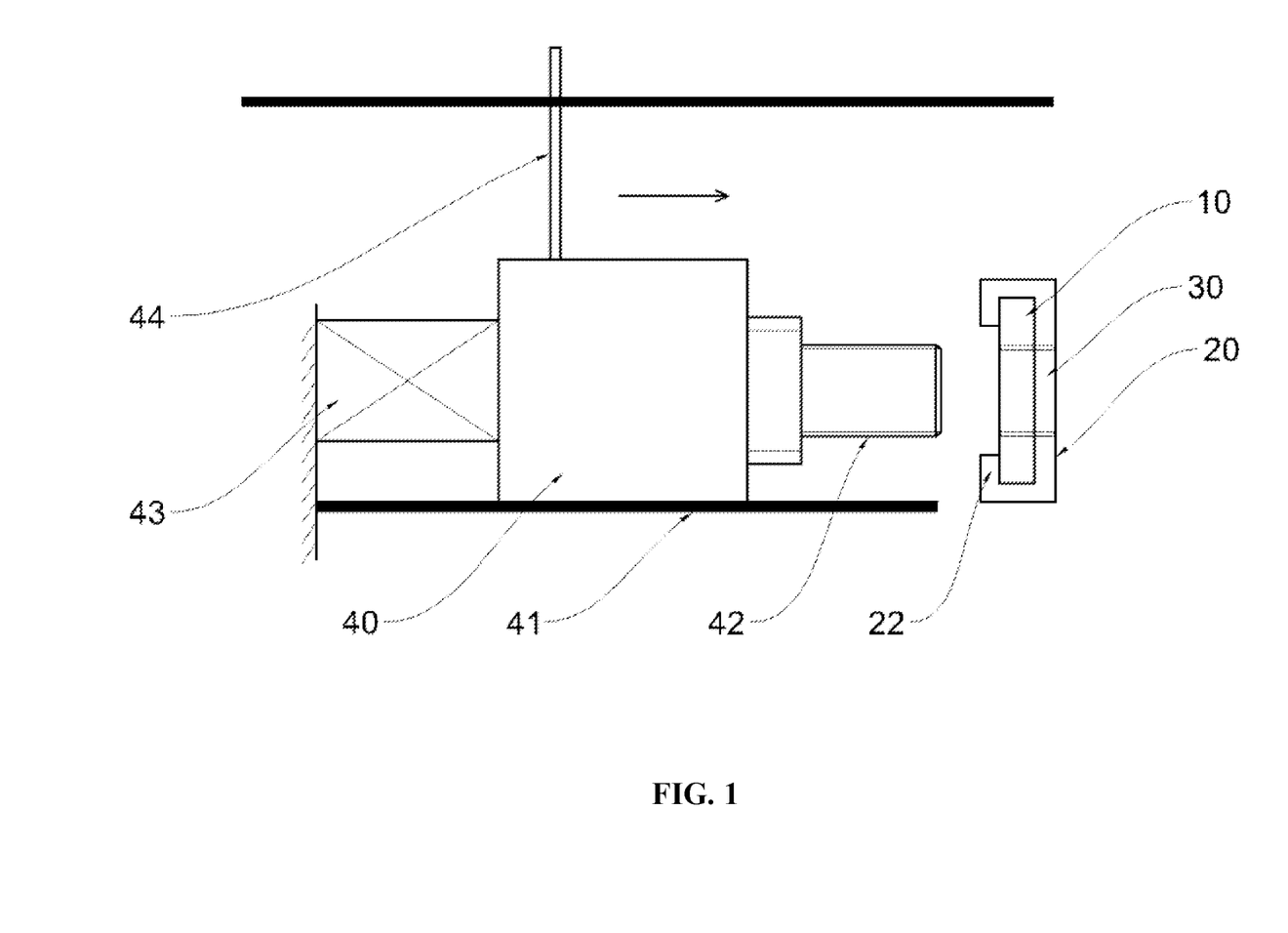
FIG. 1 is a schematic diagram of a switchgear in accordance with one embodiment of the disclosure.
Figure 2:
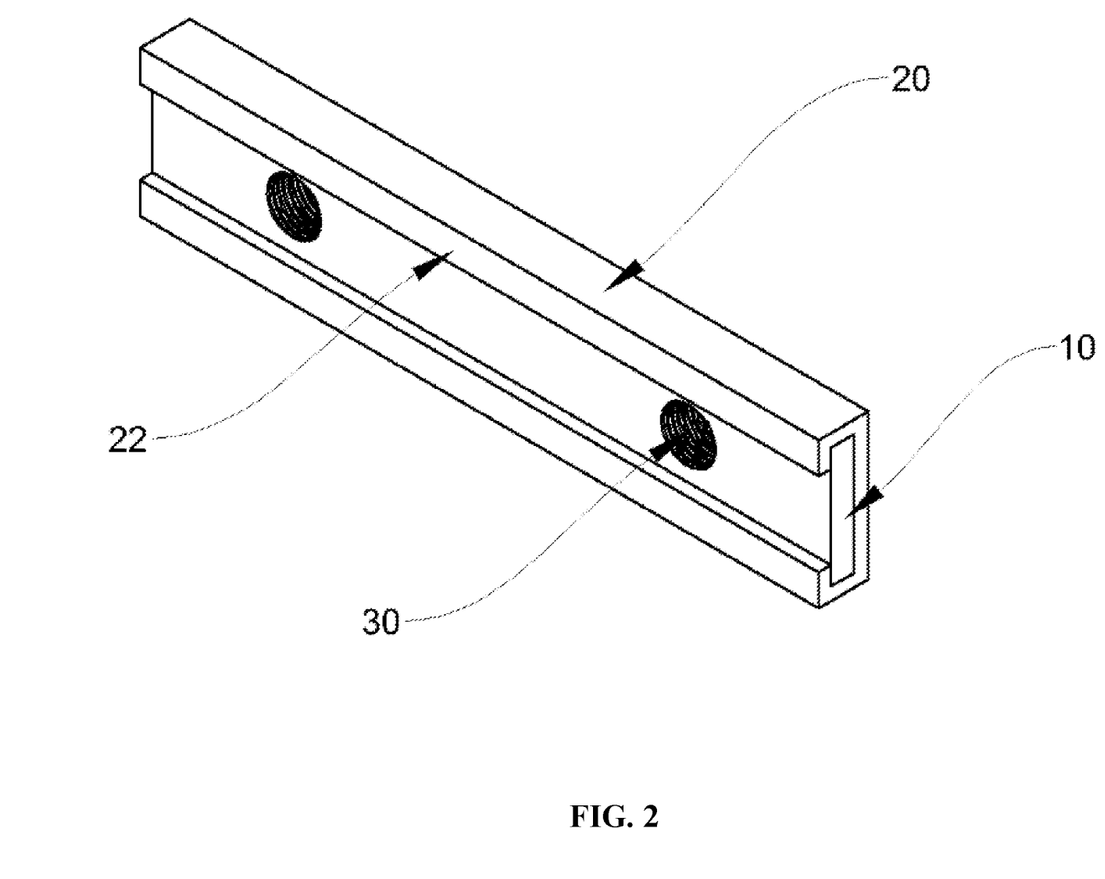
FIG. 2 shows a connection of a copper busbar and a copper incoming line in accordance with one embodiment of the disclosure.
Figure 3:
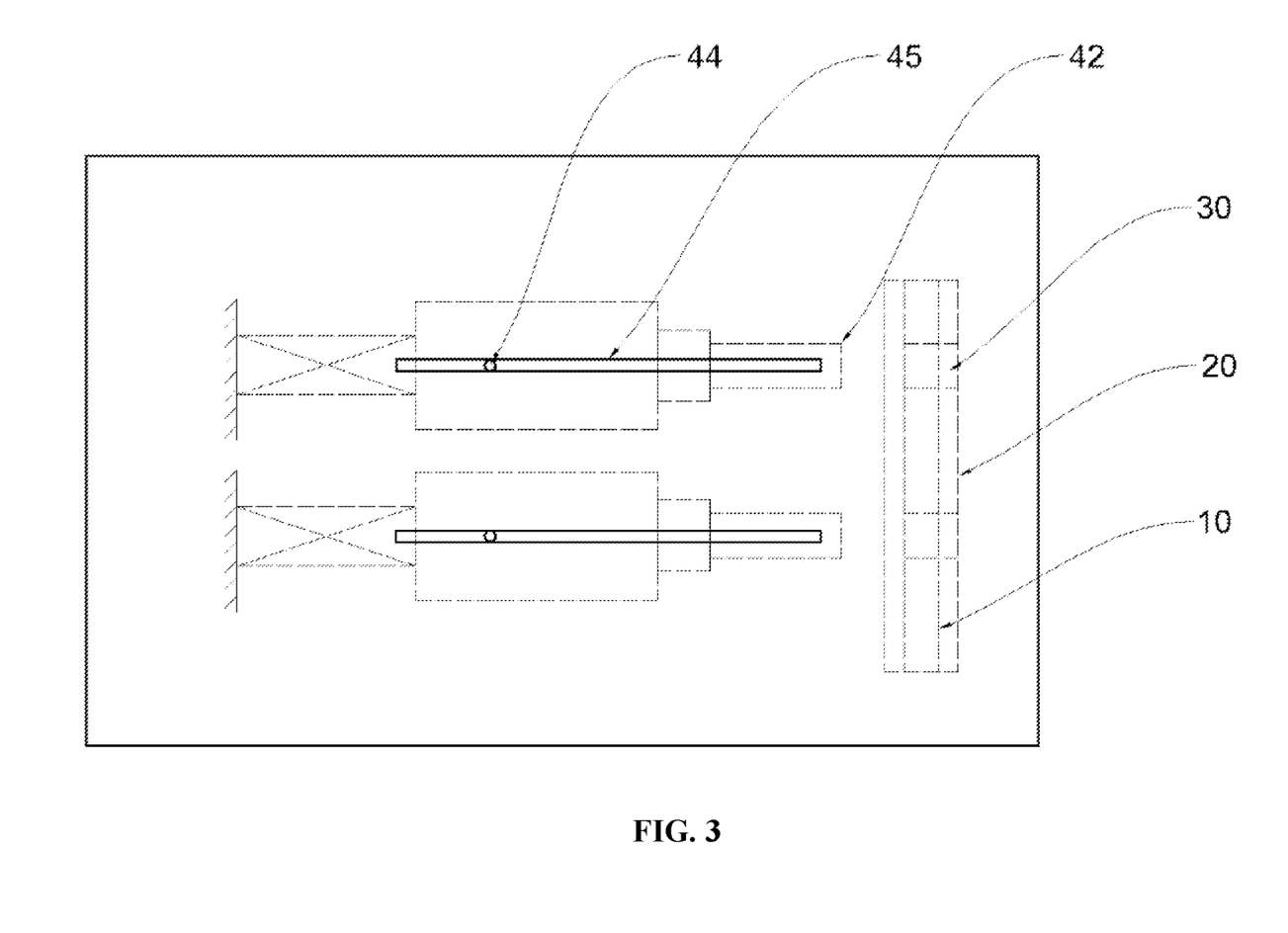
FIG. 3 is a top view of an operating handle in accordance with one embodiment of the disclosure.

As shown in FIGS. 1-3, the disclosure provides a switchgear comprising two high-voltage switch cabinets, a copper busbar 20, a copper incoming line 10, a support sleeve 41, a plurality of electric wrenches 40 disposed on the support sleeve 41, and a plurality of operating handles 44 disposed on the plurality of electric wrenches, respectively. The copper busbar 20 and the copper incoming line 10 are fixedly connected to the two high-voltage switch cabinets. Each high-voltage switch cabinet comprises an end cover comprising a plurality of slots. The copper busbar 20 is T-shaped and perpendicularly connected to a bus. The section of the copper incoming line 10 is rectangular. The copper busbar 20 is a guide rail comprising a body and two ends; the two ends of the guide rail are bent by 90° to form two bending parts 22, respectively; and the copper incoming line 10 is disposed in a cavity formed by the two bending parts and the body of the copper busbar 20. The copper busbar 20 and the copper incoming line 10 each comprise at least two bolt holes 30; the at least two bolt holes on the copper busbar 20 are aligned with the at least two bolt holes on the copper incoming line 10, respectively. The plurality of electric wrenches 40 each comprises a first end and a second end; the first end is provided with a bolt 42, and the second end is connected to a compression spring 43; the bolt 42 is aligned with one of the at least two bolt holes 30 of the copper busbar and the copper incoming line. The plurality of operating handles 44 is extended out of the end cover via the plurality of slots 45, respectively (an insulation plate can be disposed on the extended part of the operating handles; the operating handles are made of insulation material, thus ensuring safe operating environment). The plurality of operating handles 44 is capable of reciprocating in the plurality of slots 45, respectively.

Space is disposed between every two adjacent copper busbars 20 of a three-phase bus to meet the movement of the electric wrench 40, and in certain embodiments, the arrangement mode thereof is linear.

In certain embodiments, the plurality of slots 45 each is provided with a cover to protect the operating handles 44 and insulate the slots.

The connection of the copper busbar and the copper incoming line is described as follows: move the high-voltage switch cabinets, and insert the copper incoming line 10 into the cavity of the copper busbar 20; operate the operating handle 44 to apply an axial force to move the electric wrench 40, so that the electric wrench 40 overcomes the elastic force of the compression spring 43 and moves to the bolt hole 30 until the bolt 42 contacts the bolt hole 30; switch on the electric wrench 40 until the bolt 42 is fully screwed into the bolt hole 30; loosen the operating handle 44, and the electric wrench 40 returns to its original position under the elastic force of the compression spring 43.

In certain embodiments, an included angle between each bolt hole 30 and the outer end face of the copper busbar or the copper incoming line is 45°, so that a splayed shape is formed after the bolt 42 is inserted in the copper busbar, thus tightening the connection of the bolt and the copper busbar.

In certain embodiments, the plurality of electric wrenches 40 is an electric constant torque wrench which features low power consumption, low noise, flexible regulation, automatic stop, and stable torque.

To ensure the stable connection of the electric wrench 40 and the bolt 42, in certain embodiments, the first end of the plurality of electric wrenches 40 is magnetic and is coated with a temperature resistant insulation material. When the bolt 42 is fixed on the first end of the electric wrench 40 through the magnetic force, the temperature resistant insulation material coating on the bolt can prevent the influence of the current on the magnetism of the electric wrench 40.

In certain embodiments, one end of the electric wrench 40 is provided with an elastic expansion sleeve. The elastic telescopic sleeve can stably support the bolt 42, thus improving the coaxiality of the bolt 42 and the bolt hole 30, prolonging the service life, reducing the maintenance times. Specifically, when the bolt 42 is screwed into the bolt hole 30, the elastic expansion sleeve is compressed; when the electric wrench 40 is away from the bolt hole 30, the elastic expansion sleeve is pulled out. That is to say, the elastic expansion sleeve always plays a coaxial positioning and support role for the bolt 42.

In summary, the two high-voltage switch cabinets of the switchgear are first connected to each other through the copper busbar 20 and the copper incoming line 10 which are fixed through the operating handles 44 and the bolt 42. The design improves the connection effect of the copper busbars of the switchgear. The installation of the switchgear involves no complex disassembly operation, and can still be carried out under the condition of electrification. Especially when the cabinet body malfunctions and needs to be repaired, the switchgear can be recovered by quickly replacing the fault switch cabinet by a backup switch cabinet, thus saving the maintenance time and installation time, and the maintenance of the replaced fault switch cabinet can be arranged as needed.

Example 2

Figure 4:
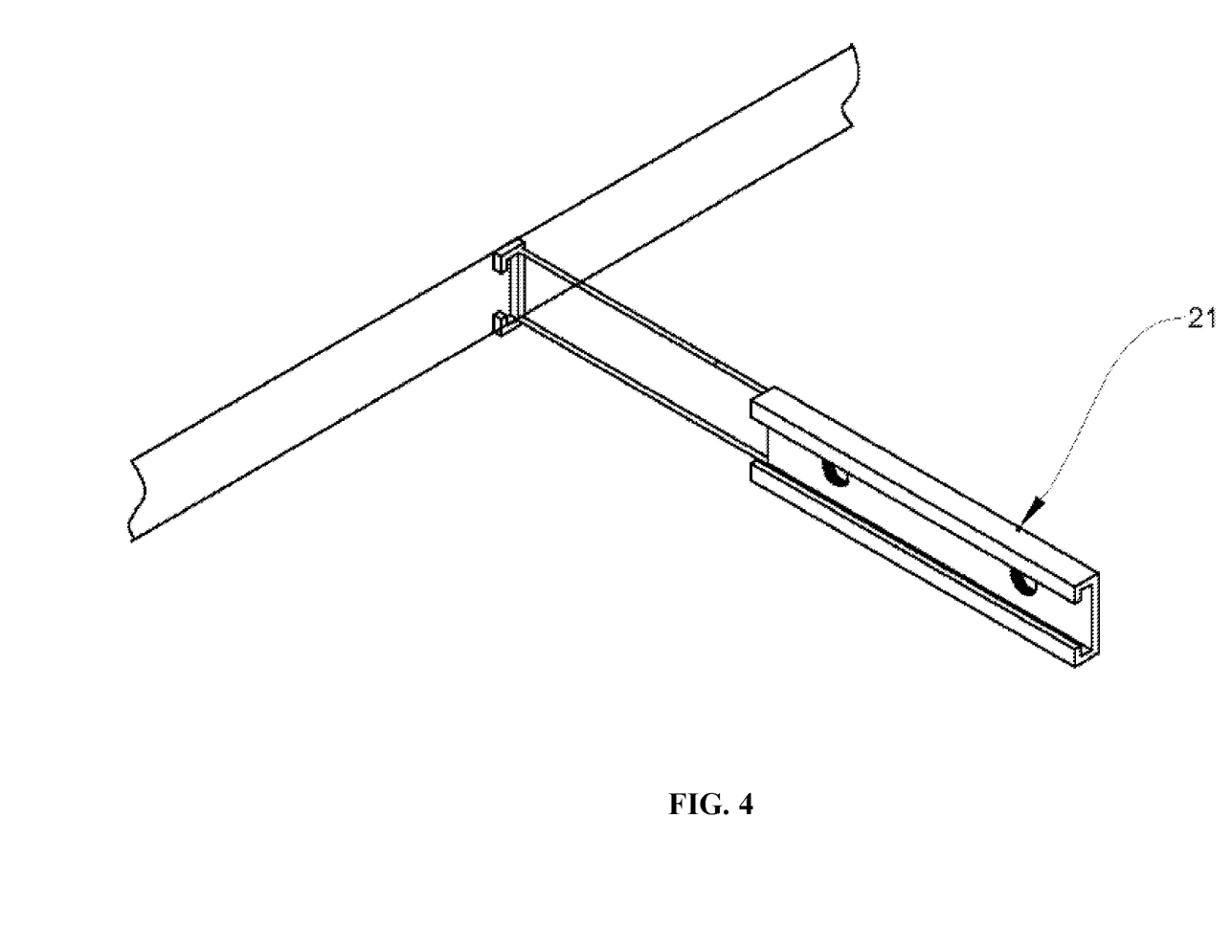
FIG. 4 is a schematic diagram of a telescopic copper busbar in accordance with one embodiment of the disclosure.

As shown in FIG. 4, the disclosure provides an improved switchgear on the basis of that in Example 1. Specifically, the guide rail of the copper busbar 20 is telescopic and comprises two members; the two members are interlocked using a hinge pin 21. In this way, when the electric wrench 40 fails to screw out the bolt 42, the copper busbar can be detached manually, so that the disassembly of the copper busbar can be fulfilled in two different modes, thus improving the safety and flexibility of the copper busbar. Specifically, the manual disassembly of the copper busbar comprises disconnecting the power supply, removing the hinge pin 21, pulling out the copper busbar 20 and the copper incoming line 10 through the telescopic guide rail, and screwing out the bolt 42 manually.

Example 3

Figure 5:
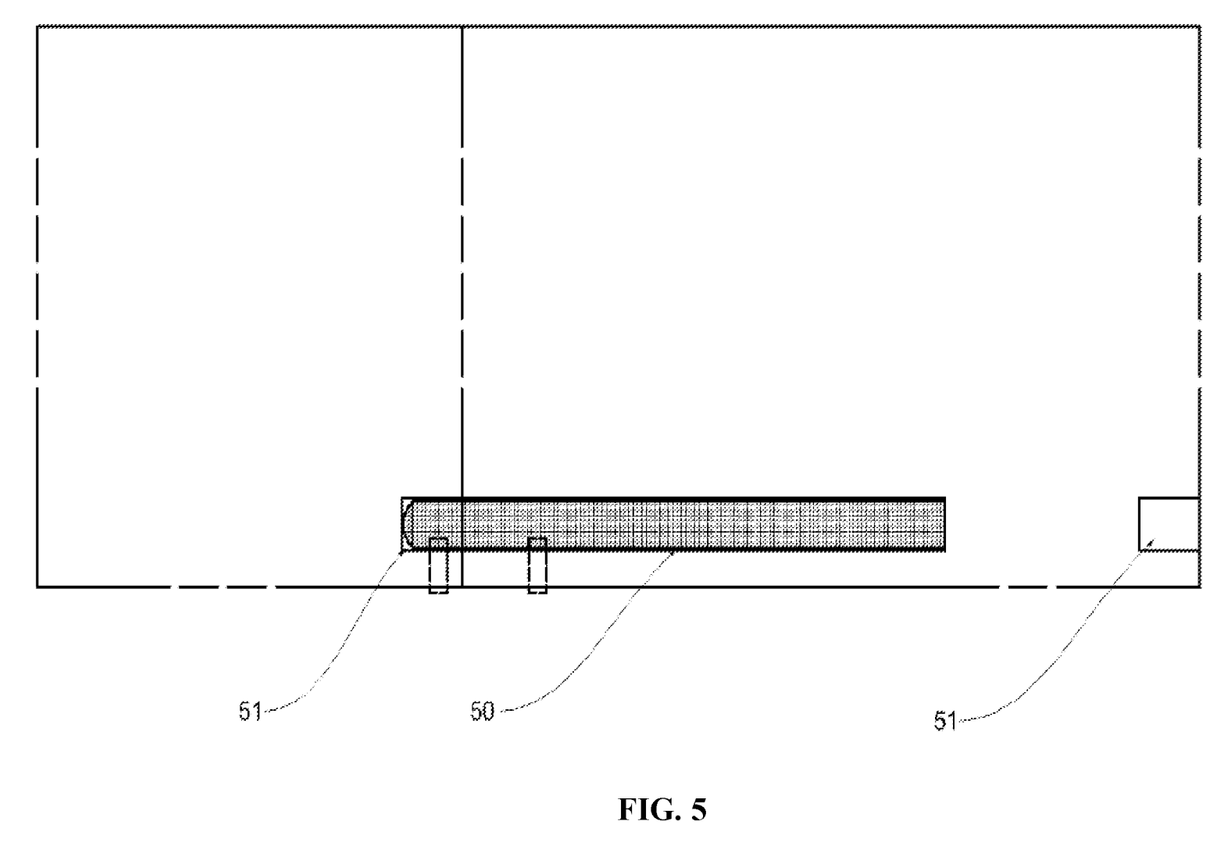
FIG. 5 shows an operation of a location rod and a location hole in accordance with one embodiment of the disclosure.

As shown in FIG. 5, the disclosure provides an improved switchgear on the basis of that in Example 2. Specifically, the two high-voltage switch cabinets each comprise a cabinet body and a passageway; two sides of the cabinet body comprise a location rod 50 and a location hole 51 matching the location rod, respectively; the location rod 50 is slidably disposed in the passageway; when the at least one high-voltage switch cabinet is installed, one end of the location rod 50 is fixed in the location hole 51 via a locking device.

Through the design of the location rod 50 and the location hole 51, the high voltage switch cabinet can be quickly aligned with adjacent ones during installation without using external rulers or tools; the locking device improves the integrity of the connection of the switch cabinets, and prevents connection failure or other accidents caused by accidental movement of the switch cabinets.

The connection mode of the locking device is magnetic connection or mechanical connection. For example, the location rod 50 and the location hole 51 are disposed on the front side, rear side or the front and rear sides of the switch cabinet; a locking hole is designed on the pipe of the switch cabinets and the side wall of the locating hole 51. The location rod 50 is provided with a rod hole corresponding to the locking hole. When to lock two adjacent switch cabinets, a lock rod passes through the locking hole and is inserted into the rod hole, which is equivalent to disposing a secondary hinge pin to strengthen the positioning and locking of the switch cabinets.

Example 4

Figure 6:
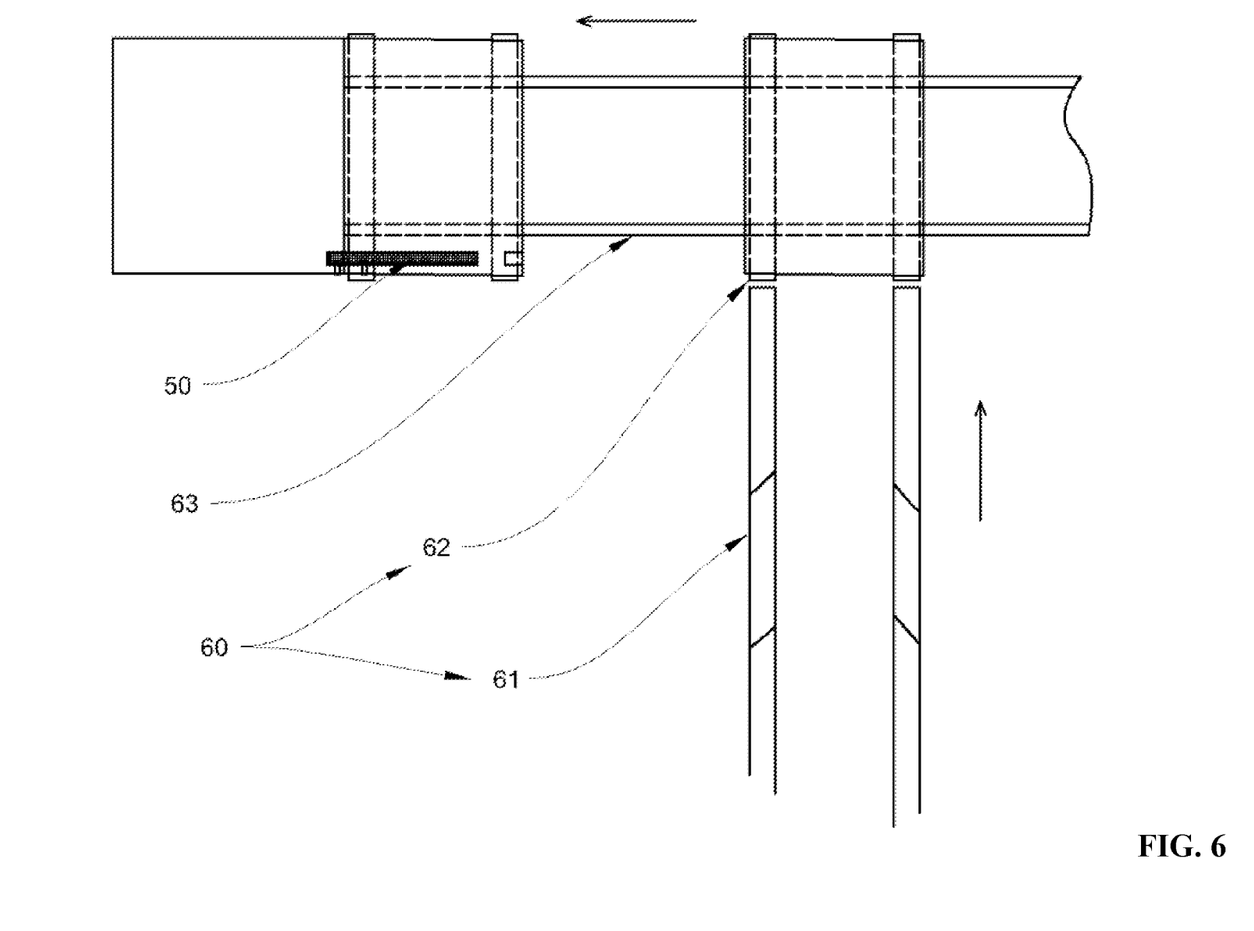
FIG. 6 is a schematic diagram of a slideway in accordance with one embodiment of the disclosure.

As shown in FIG. 6, the disclosure provides an improved switchgear on the basis of that in Example 3. Specifically, the switchgear further comprises a slideway 60 along which the at least one high-voltage switch cabinet is movable to an installation area; the at least one high-voltage switch cabinet further comprises a bottom cover provided with a groove matching the slideway 60; the slideway 60 comprises a sliding part 61 and a movable part 62; a secondary rail 63 is disposed below the movable part 62; the at least one high-voltage switch cabinet is movable from the sliding part 61 to the movable part 62 of the installation area, and then the movable part 62 moves on the secondary rail 63 to transport the at least one high-voltage switch cabinet to a target position for installation and fixation.

In another aspect, the disclosure also provides a method for replacing a high-voltage switch cabinet of the switchgear, the method comprising:

S1: separating the copper busbar 20 and the copper incoming line 10 of a broken high-voltage switch cabinet, unlocking the locking device, and moving the movable part 62 along the secondary rail 63 to connect to the sliding part 61;

S2: moving the broken high-voltage switch cabinet to a maintenance area through the sliding part 61;

S3: moving a backup high-voltage switch cabinet via the sliding part 61 to the movable part 62;

S4: inserting a location rod 50 of the backup high-voltage switch cabinet into a location hole 51 of the backup high-voltage switch cabinet;

S5: moving the movable part 62 along the secondary rail 63 to fix and fit the backup high-voltage switch cabinet with an adjacent high-voltage switch cabinet; locking the locking device, connecting the copper busbar 20 and the copper incoming line 10, and aligning corresponding bolt holes 30 of the copper busbar 20 and the copper incoming line 10;

S6: operating the plurality of operating handles 44 to linearly move the plurality of electric wrenches 40 until the bolt 42 reaches a corresponding bolt hole;

S7: switching on the plurality of electric wrenches 40 to enable the bolt 42 to insert into the corresponding bolt hole thus coupling the copper busbar 20 and the copper incoming line 10; and S8: loosening the plurality of operating handles 44, so that the plurality of electric wrenches 40 restores to original positions under an elastic force of the compression spring 43, thus achieving the replacement of the broken high-voltage switch cabinet.

In certain embodiment, S1 is implemented as follows:

S 1.1) operating the plurality of operating handles 44 to linearly move the plurality of electric wrenches 40 to catch the bolt 42;

S 1.2) reversely rotating the plurality of electric wrenches 40 to pull the bolt 42 out of the bolt hole, where the bolt is attached to the first end of the plurality of electric wrenches 40 through magnetic force;

S 1.3) loosening the plurality of operating handles 44, so that the plurality of electric wrenches 40 restores to original positions under an elastic force of the compression spring 43;

S 1.4) unlocking the locking device, and detaching the broken high-voltage switch cabinet from the device; and S 1.5) moving the movable part 62 along the secondary rail 63 to connect to the sliding part 61.

The design of the slideway 60 facilitates and accelerates the replacement of the high-voltage switch cabinet, shortens the operation time, and thus improves the working efficiency In certain embodiments, to improve the stability of the switchgear, a positioning and anti-skid device is disposed on the movable part 62 (for example, a detachable anti-skid bump is installed on each end of the movable part 62). The slideway 60 is embedded on the ground, and a cover plate is disposed on the slideway 60. The design improves the operation stability of high-voltage switch cabinet and prevents the influence of the bump on the track on the ground. In the process of replacing a plurality of switchgears, the slideway 60 is disposed at the outermost side of the switchgears. The cabinet bodies outside the fault high-voltage switch cabinet are moved to one side, and then the backup switch cabinet is inserted into the cabinet bodies and installed as a whole.

It will be obvious to those skilled in the art that changes and modifications may be made, and therefore, the aim in the appended claims is to cover all such changes and modifications.

What is claimed is:

1. A device, comprising:
    at least one high-voltage switch cabinet comprising an end cover, the end cover comprising a plurality of slots;
    a copper busbar;
    a copper incoming line;
    a support sleeve;
    a plurality of electric wrenches disposed on the support sleeve; and
    a plurality of operating handles disposed on the plurality of electric wrenches, respectively;
    wherein:
    the copper busbar and the copper incoming line are fixedly connected to the at least one high-voltage switch cabinet;
    the copper busbar has a T-shaped slot and the copper busbar is perpendicularly connected to a bus;
    a section of the copper incoming line is rectangular;
    the copper busbar is a guide rail, the guide rail comprising a body and two ends, the two ends of the guide rail are bent to form two bending parts, and the copper incoming line is disposed in a cavity formed by the two bending parts and the body of the copper busbar;
    the copper busbar and the copper incoming line each comprise at least two bolt holes; the at least two bolt holes on the copper busbar are aligned with the at least two bolt holes on the copper incoming line, respectively, forming aligned bolt hole pairs;
    the plurality of electric wrenches each comprises a first end and a second end; the first end is provided with a bolt, and the second end is connected to a compression spring, the bolt is aligned with one of the aligned bolt hole pairs of the copper busbar and the copper incoming line;
    the plurality of operating handles is extended out of the end cover via the plurality of slots, respectively; and
    the plurality of operating handles is capable of reciprocating in the plurality of slots, respectively.

2. The device of claim 1, wherein an included angle between each of the bolt holes and an outer end face of the copper busbar or the copper incoming line is 45° or 135°.

3. The device of claim 1, wherein each of the plurality of electric wrenches is an electric constant torque wrench.

4. The device of claim 3, wherein the first end of each of the plurality of electric wrenches is magnetic and is coated with a temperature resistant insulation material.

5. The device of claim 4, wherein: the guide rail of the copper busbar is telescopic and comprises two members; and
    the two members are interlocked using a hinge pin.

6. The device of claim 5, wherein:
    the at least one high-voltage switch cabinet further comprise a cabinet body and a passageway;
    two sides of the cabinet body comprise a location rod and a location hole matching the location rod, respectively;
    the location rod is slidably disposed in the passageway; and
    when the at least one high-voltage switch cabinet is installed, one end of the location rod is fixed in the location hole via a locking device.

7. The device of claim 6, further comprising a slideway along which the at least one high-voltage switch cabinet is movable to an installation area;
    wherein:
    the at least one high-voltage switch cabinet further comprises a bottom cover provided with a groove matching the slideway;
    the slideway comprises a sliding part and a movable part;
    a secondary rail is disposed below the movable part; and
    the at least one high-voltage switch cabinet is movable from the sliding part to the movable part of the installation area, and then the movable part moves on the secondary rail to transport the at least one high-voltage switch cabinet to a target position for installation and fixation.

8. A method for replacing a broken high-voltage switch cabinet of the device of claim 7 with a backup high-voltage switch cabinet, the at least one high-voltage switch cabinet including the broken high-voltage switch cabinet and the backup high-voltage switch cabinet, the method comprising:
    1) separating the copper busbar and the copper incoming line of the broken high-voltage switch cabinet, unlocking the locking device, and moving the movable part along the secondary rail to connect to the sliding part;
    2) moving the broken high-voltage switch cabinet to a maintenance area through the sliding part;
    3) moving the backup high-voltage switch cabinet via the sliding part to the movable part;
    4) inserting the location rod of the backup high-voltage switch cabinet into the location hole of the backup high-voltage switch cabinet;
    5) moving the movable part along the secondary rail to fix and fit the backup high-voltage switch cabinet with an adjacent one of the at least one high-voltage switch cabinets; locking the locking device, connecting the copper busbar and the copper incoming line, and aligning with the one of the aligned bolt hole pairs of the copper busbar and the copper incoming line;

6) operating the plurality of operating handles to linearly move the plurality of electric wrenches until the bolt reaches the one of the aligned bolt hole pairs;

7) switching on the plurality of electric wrenches to enable the bolt to insert into the one of the aligned bolt hole pairs thus coupling the copper busbar and the copper incoming line; and 8) loosening the plurality of operating handles, so that the plurality of electric wrenches restores to original positions under an elastic force of the compression spring, thus achieving a replacement of the broken high-voltage switch cabinet.

9. The method of claim 8, wherein 1) comprises:

1.1) operating the plurality of operating handles to linearly move the plurality of electric wrenches to catch the bolt;

1.2) reversely rotating the plurality of electric wrenches to pull the bolt out of the one of the aligned bolt hole pairs, wherein the bolt is attached to the first end of one of the plurality of electric wrenches through magnetic force;

1.3) loosening the plurality of operating handles, so that the plurality of electric wrenches restores to original positions under an elastic force of the compression spring;

1.4) unlocking the locking device, and detaching the broken high-voltage switch cabinet from the device; and 1.5) moving the movable part along the secondary rail to connect to the sliding part.

\* \* \* \* \*